(12) United States Patent
Ringuette et al.

(10) Patent No.: US 12,086,372 B1
(45) Date of Patent: Sep. 10, 2024

(54) UNIQUE WINDOW PREVIEW GENERATION

(71) Applicant: Lenovo (Singapore) Pte. Ltd., Singapore (SG)

(72) Inventors: Justin Ringuette, Cary, NC (US); Mark Christopher Heidenfeldt, Apex, NC (US); Mark K. Summerville, Apex, NC (US); Sandy Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/192,008

(22) Filed: Mar. 29, 2023

(51) Int. Cl.
*G06F 3/0481* (2022.01)
*G06N 20/00* (2019.01)

(52) U.S. Cl.
CPC .......... *G06F 3/0481* (2013.01); *G06N 20/00* (2019.01)

(58) Field of Classification Search
CPC .............. G06F 3/0481; G06F 3/04817; G06F 3/04842; G06F 3/0484; G06N 20/00
See application file for complete search history.

(56) References Cited

U.S. PATENT DOCUMENTS

| | | | | |
|---|---|---|---|---|
| 2006/0123353 | A1* | 6/2006 | Matthews | G06F 3/0481 715/779 |
| 2008/0115081 | A1* | 5/2008 | Sankaravadivelu | G06F 3/0481 715/783 |
| 2017/0322818 | A1* | 11/2017 | Schechter | G06F 3/04817 |

OTHER PUBLICATIONS

Dmitry V. Lipko et al., Automatic Generation of Preview Images Based on Video Sequence Analysis Using Computer Vision, Jan. 26, 2021, IEEE Conference of Russian Young Researchers in Electrical and Electronic Engineering, pp. 2154-2157 (Year: 2021).*

Erdinc Uzun et al., Automatically Discovering Relevant Images From Web Pages, Jan. 1, 2020, IEEE Access, vol. 8, pp. 208910-208921 (Year: 2020).*

* cited by examiner

*Primary Examiner* — Tam T Tran
(74) *Attorney, Agent, or Firm* — FERENCE & ASSOCIATES LLC

(57) ABSTRACT

One embodiment provides a method, the method including: receiving, at an information handling device with at least one instance of an application in use, a request to view a preview window for the at least one instance of the application; altering, utilizing the window preview system, the preview image of the at least one instance of the application from a default preview image to a unique preview image; and displaying, on a display device and utilizing the window preview system, the altered preview image to the user. Other aspects are claimed and described.

18 Claims, 3 Drawing Sheets

US 12,086,372 B1

UNIQUE WINDOW PREVIEW GENERATION

BACKGROUND

Information handling devices can successfully operate with multiple applications running simultaneously. This concurrent running of multiple applications has become commonplace with the use of a device at any point in the day. Devices ranging from a smartphone in a user's pocket to a super computer, a device's ability to run multiple applications is always present. This is apparent when a user is, for example, using a device to stream music and scroll social media, or when communicating over a teleconferencing application and taking notes in a separate word application, and/or the like. However the combination, information handling devices are designed with enough computational and operating power to successfully run multiple applications at the same time, including multiple instances of the same application.

BRIEF SUMMARY

In summary, one aspect provides a method, the method including: receiving, at an information handling device with at least one instance of an application in use, a request to view a preview window for the at least one instance of the application; altering, utilizing a window preview system, the preview image of the at least one instance of the application from a default preview image to a unique preview image; and displaying, on a display device and utilizing the window preview system, the altered preview image to the user.

Another aspect provides an information handling device, the information handling device including: at least one instance of an application in use; a display device; a processor operatively coupled to the at least one instance of an application in use and the display device; a memory device that stores instructions that when executed by the processor, causes the information handling device to: receive a request to view a preview window for the at least one instance of the application; alter, utilizing a window preview system, the preview image of the at least one instance of the application from a default preview image to a unique preview image; and display, on the display device and utilizing the window preview system, the altered preview image to the user.

A further aspect provides a product, the product including: a computer-readable storage device that stores executable code that, when executed by a processor, causes the product to: receive, at an information handling device with at least one instance of an application in use, a request to view a preview window for the at least one instance of the application; alter, utilizing a window preview system, the preview image of the at least one instance of the application from a default preview image to a unique preview image; and display, on a display device and utilizing the window preview system, the altered preview image to the user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
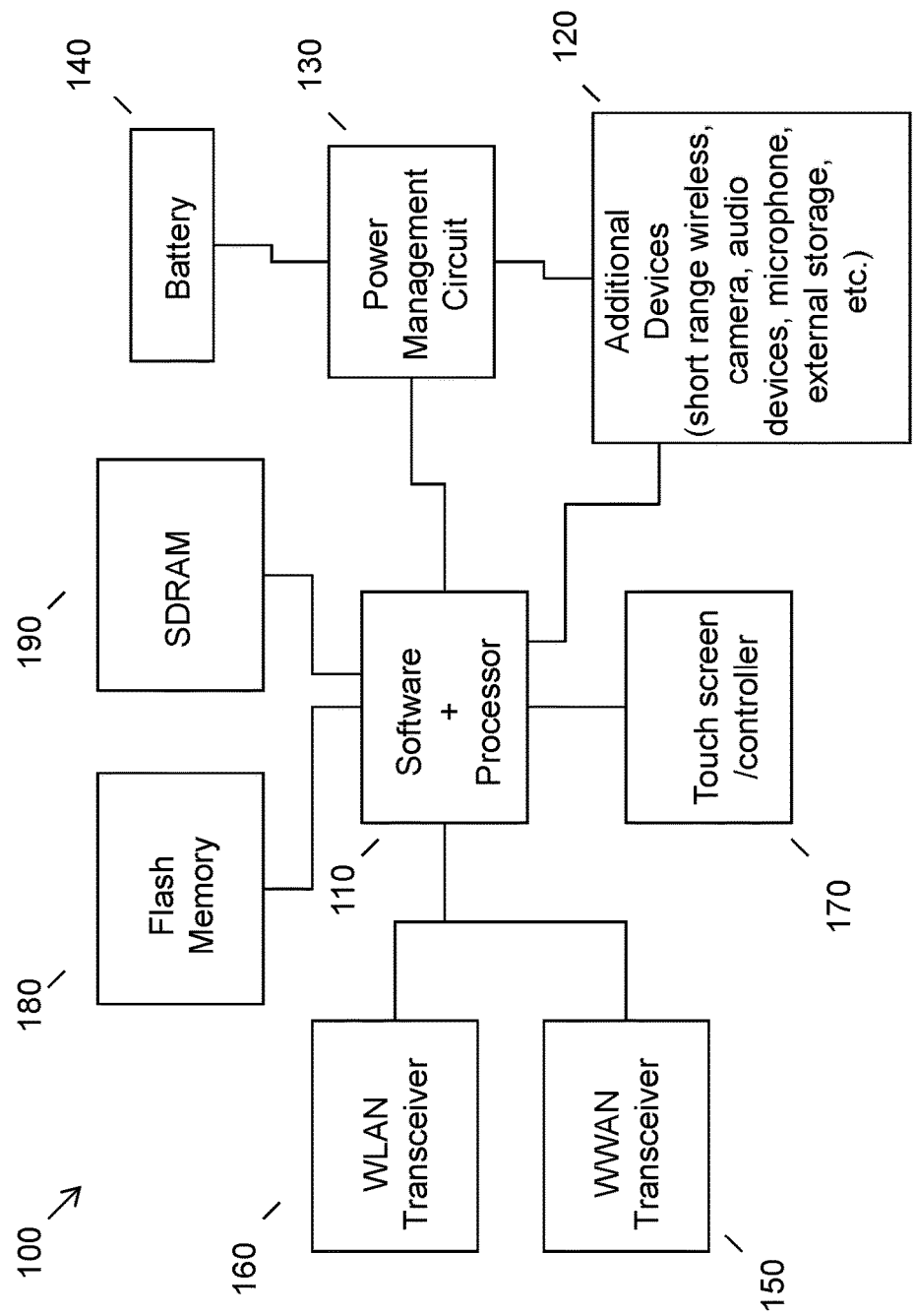
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An information handling device may successfully run while operating multiple applications simultaneously and/or multiple instances of the same application. The computational power of all information handling devices has increased to a level that permits such multitasking on a device, and the operating of multiple applications at the same time is now a common practice in everyday life, both casually and formally. For example, in a casual setting, the operating of multiple applications may include streaming a show on a smartphone while perusing one or more of a variety of accessible social media applications. As an example in a formal setting, a business may utilize one or more communication methods, such as a teleconferencing application to host a virtual meeting, that a user may access while also operating an application for accessing a database containing the information being discussed over the virtual meeting. Regardless of the combination of applications in use, or the information handling device being utilized by the user, an information handling device can operate without issue when multiple applications and/or instances of applications are running simultaneously.

When running one or more applications and/or instances of an application at an information handing device, a user and/or the system may minimize an active application as it loads information, based upon user input indicating the application should be minimized, when a user accesses other applications but does not close the active application, and/or the like. It should be noted that in the context of this disclosure, the term active application refers to an application that is open regardless of whether it is being actively accessed by the user, running in the background of the system, and/or the like. Thus, an active application is any application which may have a corresponding preview window. In a situation when multiple applications are running simultaneously but all are not all visible on the display (e.g., minimized, running in the background, open behind other applications, etc.), a system may provide a window preview image for an active application. A window preview image is an image provided back to the user identifying the application that is operating in the background or is not currently being accessed by the user. It should be noted that systems may also provide preview images for applications that are being actively accessed by the user. For example, an operating system may provide preview images for all open applications, regardless of access status, within a taskbar or other operating system ribbon tool. This window preview function is supposed to allow a user to quickly and easily distinguish each application and instances of the same application from one another so a user can select the desired application from the window preview. However, conventional methods for a window preview lack differentiating characteristics when providing a preview image to the user.

In conventional methods, an information handling device providing application preview images will use a method that may provide preview information back to a user but the preview images are end up being similar between instances of the same application or similar applications. A first conventional method includes providing a static logo, or a similar image, that is the same across all instances of the application. For example, in a conventional method, an information handling device operating multiple versions of a word processing application each instance may be represented with the same logo associated with the word processing application. Such a labeling of each window preview may permit a user to access a word processing document. However, the user may be required to select each instance of the preview image in order to find the desired instance of the word processing application. Thus, a user will have to sift through all word processing documents until finding the desired content.

In an attempt to overcome the issue of repetitive logos being presented as a window preview on an information handling, a conventional method of producing a shrunken rendering of the content in a user interface, or an application in use, may be provided as the window preview image to a user. A shrunken rendering of the content is simply a condensed version of the information present within an active application or instance of an active application. Such a rendering may provide a user with some view of the content, but it is restrained to the size of the preview image. Thus, content that is text and/or information heavy may be unreadable and therefore, fails to clearly differentiate an instance of an application from another instance of the same application or applications having similar preview images. In other words, even with the shrunken rendering providing content, a user will still have to sift through active versions of an application in order to locate the application with the desired content. What is needed is a system that may identify the content of an application in use, and based upon the content, provide a unique identifier for a window preview image that can accurately represent the content of the application. Further, a system that may determine a similarity level between window preview images and then alter the window preview image of at least one application to clearly differentiate the information present within the application from the other similar application would be helpful.

Accordingly, the described system and method provides a technique for displaying an altered window preview image to a user by use of a window preview system. In the system, an information handling device with at least one instance of an application in use may receive a request to view a preview window for the at least one instance of the application. This request may include user input to a system when a user is attempting to view the preview window (also referred to as a preview image) for any active applications operating on a device. After receiving, a window preview system may then alter the preview image of the at least one instance of the application from a default preview image to a unique preview image. In the system, altering the preview image may be in response to determining a level of similarity between the original or default preview image of one or more active applications. Then, in the system, the window preview system may display, on a display of the information handling device, the altered window preview containing or based upon a unique identifier to the user in order to distinguish preview images from each other, thereby allowing the user to more accurately select the window preview of an application containing the desired content of the user. Such a system provides improvements over conventional methods of differentiating window previews imagery by utilizing a window preview system to identify content of an application and dynamically determine and generate an accurate altered window preview to provide back to the user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
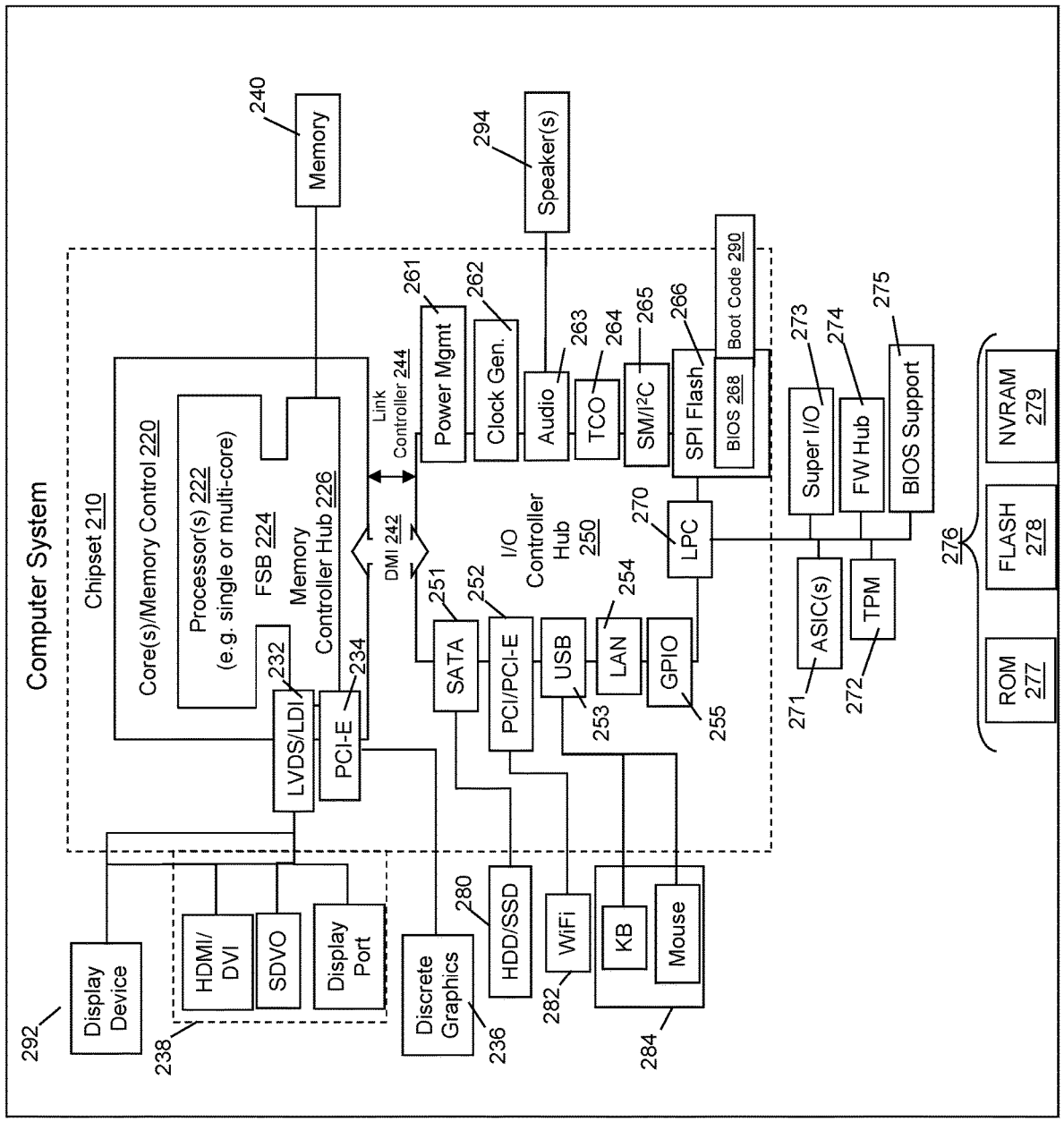
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that receives a request to view a preview window image for at least one instance of an application and thereafter alters the preview image of the at least one instance of the application from a default preview image to a unique preview image to be displayed back to the user. For example, the circuitry outlined in FIG. 1 may be implemented in a tablet or smart phone embodiment, whereas the circuitry outlined in FIG. 2 may be implemented in a personal computer embodiment.

Figure 3:
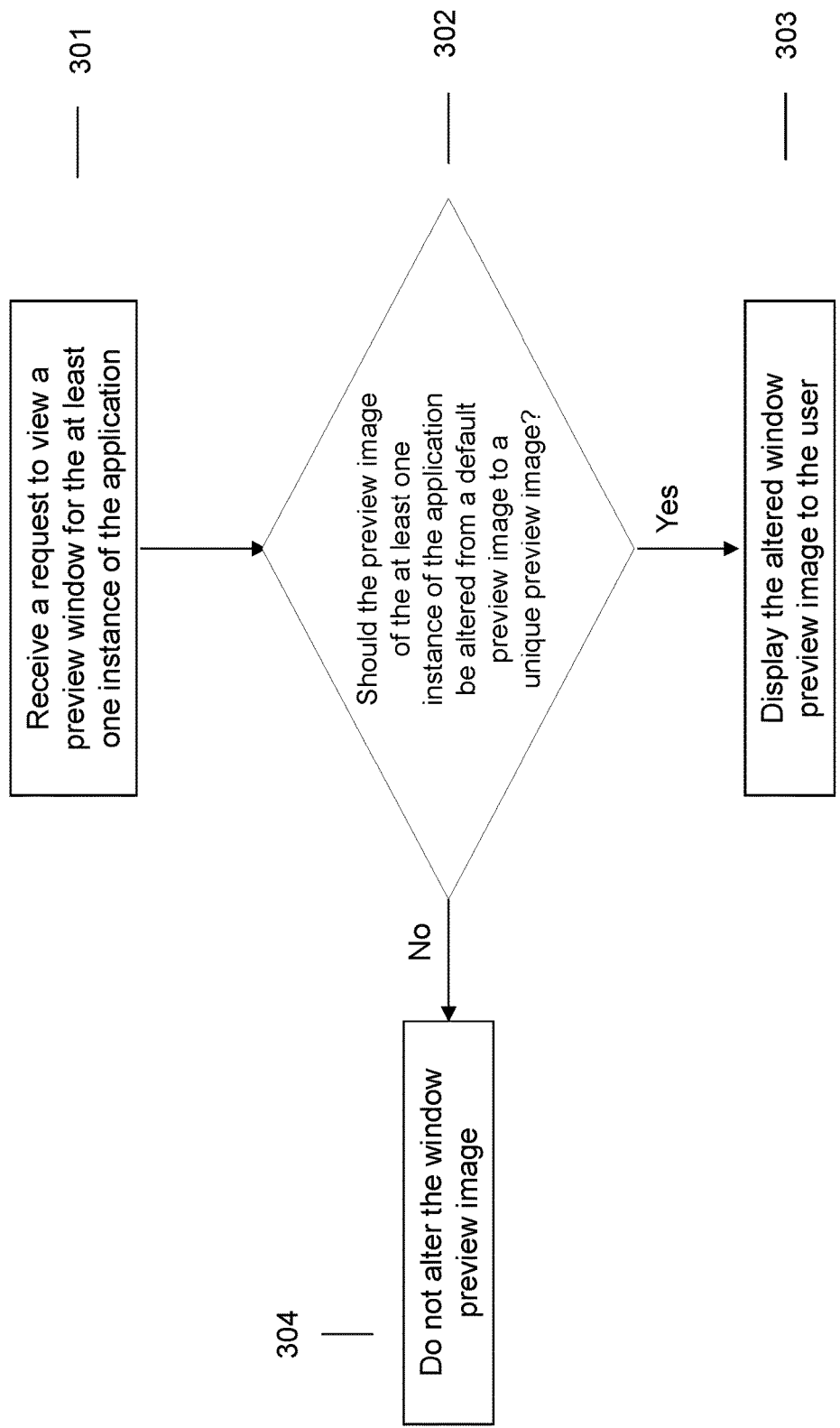
FIG. 3 illustrates an example method for generating and displaying an altered window preview to a user by use of a window preview system.

FIG. 3 illustrates an example method for displaying an altered window preview to a user by use of a window preview system. The method may be implemented on a system which includes a processor, memory device, output devices (e.g., display device, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the window preview system itself is specifically programmed to perform the functions as described herein to display an altered window preview image to the user upon receiving a request to view a preview window for at least one instance of an application.

The window preview system may run in the background of an information handling device and may be activated when the device is activated. Additionally, or alternatively, the system may be activated when a window preview interface is activated, detected, or otherwise opened. The system may also activate the system upon the receiving of a request to view a preview window for at least one instance of an application. In this case, the window preview system may not be activated until at least one request to view a preview window image is made by the user.

Once the window preview system is activated on a device, the system may be utilized throughout the process of receiving a request to view a preview window for at least one instance of an application, altering the preview image of the at least one instance of the application from a default preview image to a unique preview image, and displaying the altered preview image to the user. Continued use of the window preview system receiving requests and altering the preview image of the at least one instance of the application from a default preview image to a unique preview image will train the device in producing an altered window preview image and displaying the altered preview image to the user. In other words, the system may learn what preview images need to be altered, when the preview images need to be altered, what unique preview image to generate for an application instance, and/or the like.

Accordingly, to perform the steps present in the window preview system and in order to accurately alter and display the altered preview image to the user, the system may utilize a neural network, machine-learning model, and/or other learning algorithm, collectively referred to as a machine-learning model for ease of readability. The machine-learning model can be trained utilizing previously supplied requests to view preview images, altered preview images, and displayed altered preview images. In other words, the machine-learning model is given access to previously received requests to view a preview image and altered preview images from a default image to a unique preview image. Additionally, the machine-learning model receives previously displayed altered window previews and the corresponding unique preview images to further train the machine-learning model. These established requests to view a preview window, altered preview images from a default image to a unique preview image, and displaying the altered window preview are referred to as a training dataset.

Using the training dataset, which may change over time, the machine-learning model learns nuances between default preview images and unique preview images associated with an instance of an application. This results in more accurately altering a window preview image and displaying the altered preview image to the user. For example, the machine-learning model can learn when the window preview system should alter the preview image of the at least one instance of the application from a default preview image to a unique preview image. As information is determined within a request to view a preview window for the at least one instance of the application, the types of preview window images that are altered, the unique window image that is generated, and/or the like, the machine-learning model can learn additional nuances and become more accurate and refined over time. Thus, while there is an initial training dataset that is used to initially train the machine-learning model, the machine-learning model is learning over time based upon new information received by the machine-learning model, thereby evolving to become more accurate. This learning may be based upon the automatic digestion of feedback by the machine-learning model in order to become more refined and accurate over time.

At 301, an information handling device with at least one instance of an application in use may receive a request to view a preview window for at least one instance of an application. Receiving the request to view a preview window may be responsive to user input at the information handling device (e.g., a command performed at a keyboard of the information handling device, a command performed at a touchscreen of an information handling device, command performed at a peripheral device of the information handling device, etc.). For example, a user may hover over a window preview icon, select a preview image for a set of active instances of an application, minimize all open or foreground applications, provide a particular input for previewing active applications (e.g., a particular swipe action on a touch screen device, selecting a particular icon associated with viewing preview images, etc.), and/or the like.

The request may be responsive to a user accessing a new instance of an application that is already in use. For example, if a word processing application is already operating, and a user elects to open an additional document with different content utilizing the same word processing application, a user interface associated with the application in use may provide a window preview interface for each instance of the same application. As previously mentioned, the system may receive a request to view a preview window in a plurality of ways. In order to increase readability, this disclosure may reference specific request types. However, these are intended to be non-limiting examples, and other techniques for providing or receiving a request are contemplated and possible.

Subsequent to receiving a request to view a preview window for the at least one instance of the application, at 301, the system may then determine if the preview image of the at least one instance of the application should be altered from a default preview image to a unique preview image, at 302. To determine whether the preview image should be altered, the system may utilize user preferences, historical information, machine-learning models, crowd-sourced data, a number of applications or application instances that are active, the type of applications that are active, a device being utilized, and/or the like. For example, when it is determined that only one application is in use at the information handling device, a window preview system may determine that a window preview image for the one application in use does not need to be altered, at 304. However, it should be noted that the system may also alter the default preview image of an application or application instance even if there is only a single application or application instance active. By altering the default image, this may allow the user to quickly determine what the user was utilizing the application or application instance to accomplish. A user may also indicate via user preferences when default preview images should be altered.

As another example, the system may utilize historical information, crowd-sourced data, and/or machine-learning models to identify when it is appropriate or useful to alter a preview image to a unique preview image. The historical information, crowd-sourced data, and/or machine-learning models may provide information that indicates when the user or other users have had difficulty distinguishing applications or application instances, thereby indicating that the default preview image should be altered. Some information that may indicate a difficulty in distinguishing applications or application instances may include detecting a user quickly switching between applications or application instances, user input (e.g., voice input, gesture input, facial gestures, etc.) that indicates the user is having difficulty differentiating between applications or application instances, similarity calculations regarding application preview images, and/or the like. The system may also utilize one or more similarity calculations or algorithms to measure a similarity between application and/or application instance preview images. Similarities meeting or exceeding a predetermined threshold may indicate that the preview images should be altered. If the system determines that the preview image of at least one of the application and/or application instance does not need to be altered, the system may not alter the window preview image at 304.

On the other hand, when it is determined, at 302, that a preview image of the at least one instance of the application should be altered from a default preview image to a unique preview image, at 302, a window preview system may alter the preview window to the unique preview window at 303. Thus, the system may undergo steps in order to accurately disambiguate the at least one instance of the application from at least one other instance of the application and/or a determined similar preview image present for at least one instance of a different application. It should be noted that it is described that a single application or application instance preview window is altered. However, this is only for ease of readability and it should be understood that multiple application and/or application instance preview windows can be analyzed and altered at 303.

In the system, when determining if the preview image of the at least one instance of the application should be altered, at 302, the window preview system may first identify at least two instances of the application in use. The at least two instances of the application in use means that the same application is used to access two different pieces of information (e.g., word documents, databases, presentations, etc.). In other words, though the application in use is the same, the content of the at least two instances of the application are different. At this point in the system, the window preview system may determine that a similarity between the window preview image of the at least two instances is present, and altering the preview image of at least one instance of the application from a default preview image to a unique preview image is appropriate. This altering of the preview image of one of the at least two instances of the application is intended to disambiguate the one of the at least two instances from the other of the at least two instances.

Generating or determining a unique preview image for any preview images that need to be altered may include utilizing the window preview system to first identify a unique identifier for the at least one instance of the application in use. In identifying and determining a unique identifier for the at least one instance, the window preview system may parse the content within the at least one instance of the application. Parsing the content within the at least one instance of the application may include utilizing one or more content extraction and analysis techniques including, but not limited to, information extraction, entity identification, semantic analysis, image analysis, syntactic analysis, machine-learning models, crowd-sourced data, historical information, secondary information sources, and/or the like. The parsing of the content results in a collection of potential unique identifiers for the content of the instance of the application. One or more of these unique identifiers can be utilized when generating the unique preview image.

For example, subsequent to parsing the content of the at least one instance of the application, the system may determine that the content of the at least one instance is directed towards the rules surrounding basketball. This heavily text-based content of the instance of the application may include a header that reads, for example, "THE RULES OF BASKETBALL" and continue on to provide additional text details. In the system, the window preview system may determine that the presence of the text header disambiguates the at least one instance of the application from additional instances of the applications that may include different content. Thus, the system may determine the unique identifier and, therefore, the content shown in the unique preview image may include this identified header.

In the system, parsing the content of the at least one instance of the application may include identifying imagery present in the content. This image may then be used as the unique identifier. Continuing the example above, the content of the instance of the application may discuss the rules of basketball, and may additionally include images of basketball related components, for example, the image of an orange basketball, an image of a hoop with a backboard and a net, an example jersey style, and/or the like. In the system, the window preview system may determine that a unique identifier for this instance of the application may be more easily differentiated from at least one other instance of the application when the unique identifier utilized is an image present in the content of the application, for example, the image of an orange basketball.

The system may also correlate content included in the application instance to other distinguishing content and using the distinguishing content as the unique identifier. Using the basketball example above and assuming the content does not include imagery, the system may identify the header, identify "basketball" as a keyword within the header (or other content within the application), and then select an image of a basketball as the unique identifier to be included in the unique preview image. This may be particularly useful for small preview images. The correlation of content to other possible unique identifiers may include the use of a machine-learning model, accessing secondary sources, performing queries against secondary sources, and/or the like. For example, the system may utilize the term "basketball" as a query term and filter results by images to find an image of a basketball to be used within the unique preview image.

In the system, when identifying a unique identifier for the at least one instance of the application in use, the window preview system may identify a participant within the at least one instance of the active application. For example, if the application in use is a communication application or application that allows for communications (e.g., an instant messaging application, social media site, email communication window, etc.), the window preview system may identify who a user is communicating with via the application. The system may then utilize a characteristic of the user whom is being communicated with as the unique identifier, for example, an image of the another user, an image associated with the another user, a unique characteristic of the another user, a common phrase used by the another user, and/or the like.

Additionally, or alternatively, the unique preview image may be a predetermined image that is selected by the application. In the system, an order of potential unique identifiers may be predetermined, and in response to the window preview system determining a similarity between images exceeds a predetermined threshold, as mentioned previously, the at least one application may select an appropriate unique preview image from the predetermined images or content. In the system, these predetermined unique preview images may be assigned by a manufacturer, may be based upon user preference, learned by the system over time, preselected by a machine-learning model, selected by the application itself, and/or the like.

Once an appropriate unique identifier is identified, the window preview system may assign the unique identifier as the preview image for the at least one instance of the application in use. In other words, the window preview image associated with the at least one instance of the application may be altered from a default preview image to a unique preview image that now contains the unique identifier. For example, in the system, if the default preview image of the application was an image of the logo of the application in use, the unique preview image (e.g., the image of the orange basketball), will replace the default image of the logo for the window preview image for the application and/or application instance.

It should be noted that more than one unique identifier may be identified for an application or application instance. In this case, the system may perform some analysis, for example, similarity analysis, analysis using a machine-learning model, and/or the like, refer to user preferences, refer to secondary information sources, and/or the like, to determine what unique identifier should be utilized. Once a unique identifier is selected, the system may monitor the user for feedback to determine if the unique identifier is helpful for disambiguating the application and/or application instance. This information can be used by the system in the future for selecting unique identifiers for applications and/or application instances.

At 303, subsequent to determining a default preview image should be altered and altering the preview image to a unique preview image, the system may display the altered preview image to the user. Displaying the altered preview image to the user may include performing one or more actions with respect to the default preview image. One action includes overlapping the default preview image with the unique preview image. Using the basketball example above, if the unique preview image is determined to be an image of an orange basketball, the default preview image (e.g., logo of the application) will be overlaid with the image of the orange basketball that was found in the content of the at least one application in use.

Another action may include replacing the default preview image with the unique preview image. This may include the system removing the default preview image and replacing it with the unique preview image. Another action may include enlarging the unique identifier within the default preview image. For example, if the default preview image is a shrunken rendering of the content within the application, the system may simply enlarge, change the text color of, animate the image, or otherwise highlight the identified unique identifier within the shrunken content. Other actions are contemplated and possible.

The various embodiments herein thus describe a technical improvement over conventional methods for displaying an altered window preview to a user. In the system, an information handling device with at least one instance of an application in use may receive a request to view a preview window for the at least one instance of the application. Based upon information collected by a window preview system, the system may determine that the preview image of the at least one instance of the application should be altered from a default preview image a unique preview image. Altering the preview image to a unique preview image assists in disambiguating an instance of an application in use from another instance of the application in use and/or from an application in use that has a similar default preview image to another application. Rather than attempting to provide extensive content information in an attempt to differentiate window preview images, the window preview system identifies a unique identifier from the contents of the application in use, and utilizes the unique identifier to generate the unique preview image of the at least one instance of the application. Thus, such a system and method provides a more effective technique for differentiating instances of applications and/or applications from each other.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device with at least one instance of an application in use, a request to view a preview window for the at least one instance of the application;
altering, utilizing a window preview system, the preview image of the at least one instance of the application from a default preview image to a unique preview image, wherein the altering comprises:
identifying, utilizing the window preview system, a unique identifier for the at least one instance of the application in use; and
assigning, utilizing the window preview system, a unique identifier as the unique preview image for the at least one instance of the application in use; and
displaying, on a display device and utilizing the window preview system, the altered preview image to the user.

2. The method of claim 1, comprising identifying at least two instances of the application in use and wherein the altering comprises altering the preview image of one of the at least two instances to disambiguate the one of the at least two instances from the other of the at least two instances.

3. The method of claim 1, wherein the identifying comprises parsing content of the at least one instance of the application in use to extract the unique identifier.

4. The method of claim 1, wherein the identifying comprises identifying a participant within the at least one instance of the application in use and assigning a characteristic of the participant as the unique identifier.

5. The method of claim 1, comprising identifying at least one instance of at least two applications are in use and the at least two applications have default preview images exceeding a predetermined threshold of similarity and wherein the altering is responsive to the identifying.

6. The method of claim 1, wherein the altering comprises identifying a unique preview image utilizing a machine-learning model to identify a preview image having a similarity to the default preview image less than a predetermined threshold.

7. The method of claim 1, wherein the altering comprises utilizing a unique identifier corresponding to the at least one instance of the application and wherein establishing the unique identifier occurs responsive to the receiving a request.

8. The method of claim 1, wherein the displaying comprises overlapping the default preview image with the unique preview image.

9. The method of claim 1, wherein the unique preview image is selected by the application.

10. An information handling device, the information handling device comprising:
at least one instance of an application in use;
a display device;
a processor operatively coupled to the at least one instance of an application in use and the display device;
a memory device that stores instructions that when executed by the processor, causes the information handling device to:
receive a request to view a preview window for the at least one instance of the application;
alter, utilizing a window preview system, the preview image of the at least one instance of the application from a default preview image to a unique preview image, wherein the altering comprises:
identifying, utilizing the window preview system, a unique identifier for the at least one instance of the application in use; and
assigning, utilizing the window preview system, the unique identifier as the unique preview image for the at least one instance of the application in use; and
display, on the display device and utilizing the window preview system, the altered preview image to the user.

11. The information handling device of claim 10, comprising identifying at least two instances of the application are in use and wherein the altering comprises altering the preview image of one of the at least two instances to disambiguate the one of the at least two instances from the other of the at least two instances.

12. The information handling device of claim 10, wherein the identifying comprises parsing content of the at least one instance of the application in use to extract the unique identifier.

13. The information handling device of claim 10, wherein the identifying comprises identifying a participant within the at least one instance of the application in use and assigning a characteristic of the participant as the unique identifier.

14. The information handling device of claim 10, comprising identifying at least one instance of at least two applications are in use and the at least two applications have default preview images exceeding a predetermined threshold of similarity and wherein the altering is responsive to the identifying.

15. The information handling device of claim 10, wherein the altering comprises identifying a unique preview image utilizing a machine-learning model to identify a preview image having a similarity to the default preview image less than a predetermined threshold.

16. The information handling device of claim 10, wherein the altering comprises utilizing a unique identifier corresponding to the at least one instance of the application and wherein establishing the unique identifier occurs responsive to the receiving a request.

17. The information handling device of claim 10, wherein the displaying comprises overlapping the default preview image with the unique preview image.

18. A product, the product comprising:
A non-transitory computer-readable storage device that stores executable code that, when executed by the processor, causes the product to:
receive, at an information handling device with at least one instance of an application in use, a request to view a preview window for the at least one instance of the application;
alter, utilizing the window preview system, the preview image of the at least one instance of the application from a default preview image to a unique preview image, wherein the altering comprises:
identifying, utilizing the window preview system, a unique identifier for the at least one instance of the application in use; and
assigning, utilizing the window preview system, the unique identifier as the unique preview image for the at least one instance of the application in use; and
display, on a display device and utilizing the window preview system, the altered preview image to the user.

* * * * *